United States Patent
Chasney

(10) Patent No.: US 12,283,263 B1
(45) Date of Patent: Apr. 22, 2025

(54) SECURE AUDIO FIREWALL TO NEUTRALIZE PROMISCUOUS LISTENING DEVICES

(71) Applicant: Jeffrey Chasney, Sarasota, FL (US)

(72) Inventor: Jeffrey Chasney, Sarasota, FL (US)

( * ) Notice: Subject to any disclaimer, the term of this patent is extended or adjusted under 35 U.S.C. 154(b) by 0 days.

(21) Appl. No.: 18/784,489

(22) Filed: Jul. 25, 2024

Related U.S. Application Data

(60) Provisional application No. 63/664,056, filed on Jun. 25, 2024.

(51) Int. Cl.
| | | |
|---|---|---|
| H04L 29/06 | (2006.01) | |
| G10K 11/175 | (2006.01) | |
| G10L 17/24 | (2013.01) | |
| H04R 1/02 | (2006.01) | |
| H04R 3/00 | (2006.01) | |

(52) U.S. Cl.
CPC .......... *G10K 11/1754* (2020.05); *G10L 17/24* (2013.01); *H04R 1/025* (2013.01); *H04R 3/00* (2013.01)

(58) Field of Classification Search
CPC .... G10K 11/1754; G10L 17/24; H04R 1/025; H04R 3/00
See application file for complete search history.

(56) References Cited

U.S. PATENT DOCUMENTS

| | | | |
|---|---|---|---|
| 2008/0008470 A1* | 1/2008 | Lin | G09G 5/006 398/66 |
| 2019/0371337 A1* | 12/2019 | Bunker | G10L 15/22 |

FOREIGN PATENT DOCUMENTS

| | | | | |
|---|---|---|---|---|
| CN | 203243413 U | * | 10/2013 | |
| CN | 104701928 B | * | 9/2018 | .......... F21V 33/0004 |
| CN | 115273859 A | * | 11/2022 | .............. G10L 17/02 |
| EP | 3764260 A1 | * | 1/2021 | .............. G06F 21/56 |
| WO | WO-2004091213 A1 | * | 10/2004 | .............. H04L 69/08 |
| WO | WO-2005079285 A2 | * | 9/2005 | .............. F02B 77/13 |
| WO | WO-2015093156 A1 | * | 6/2015 | .............. H01J 37/185 |
| WO | WO-2015119340 A1 | * | 8/2015 | .............. G06F 21/30 |
| WO | WO-2016111728 A1 | * | 7/2016 | .............. G06F 21/70 |

\* cited by examiner

*Primary Examiner* — Shawnchoy Rahman
(74) *Attorney, Agent, or Firm* — Holzer Patel Drennan

(57) ABSTRACT

A secure audio firewall may detect, from an audio recording captured in an external environment of a secure audio firewall enclosure, a passphrase uttered by the user. A secure audio firewall may activate sound transmission measures of the secure audio firewall enclosure responsive to detecting the passphrase, wherein the sound transmission measures facilitate transmission of the sound in the external environment to the internal environment.

20 Claims, 6 Drawing Sheets

500

Detect, from an audio recording captured in an external environment of a secure audio firewall enclosure, a passphrase, wherein the secure audio firewall enclosure is configured with sound mitigation measures to suppress sound in the external environment as it traverses the secure audio firewall enclosure to an internal environment within the secure audio firewall enclosure
510

Activate sound transmission measures of the secure audio firewall enclosure responsive to detecting the passphrase, wherein the sound transmission measures facilitate transmission of the sound in the external environment to the internal environment
520

FIG. 5

SECURE AUDIO FIREWALL TO NEUTRALIZE PROMISCUOUS LISTENING DEVICES

CROSS-REFERENCE TO RELATED APPLICATION

This application claims priority to U.S. Provisional Application No. 63/664,056, filed Jun. 25, 2024, and entitled, "Secure Audio Firewall to Neutralize Promiscuous Listening Devices." The above-referenced patent application is specifically incorporated herein for all that it discloses and teaches.

BACKGROUND

Smartphones and other user computing devices are often configured with software assistants that can respond to voice requests of a user. However, even though assistants and other applications on the user computing device may not analyze user speech until the activation keyword is detected, user computing devices transmit the recorded audio to remote servers when the user later receives marketing material relevant to the recorded audio. Even when users configure settings of applications on the user computing device to ask the applications not to access any data recorded by the microphone, users may still be subjected to promiscuous listening and use of detected sound (e.g., conversations the user was involved in, a TV show the user watched, an action of the user that produces sound such as unlocking a door, etc.) that the smartphone transmitted to the remote servers. Accordingly, users are concerned about the privacy of their activities and conversations conducted in the presence of user computing devices.

SUMMARY

In some aspects, the techniques described herein relate to a method for operating a secure audio firewall enclosure. The secure audio firewall enclosure is configured with sound mitigation measures to suppress the transmission of sound from an external environment to an internal environment within the secure audio firewall enclosure, the method including: detecting, from an audio recording captured in an external environment of a secure audio firewall enclosure, a passphrase uttered by a user; and activating sound transmission measures of the secure audio firewall enclosure responsive to detecting the passphrase, wherein the sound transmission measures facilitate transmission of the sound in the external environment to the internal environment.

In some aspects, the techniques described herein relate to a secure audio firewall system configured to prevent, absent activation of sound transmission measures of the secure audio firewall, a user computing device in an internal environment of the secure audio firewall from detecting content of sound originating from an external environment of the secure audio firewall, the secure audio firewall including: walls forming an enclosure of the secure audio firewall, the enclosure separating the internal environment from the external environment; an external microphone configured to record sound of the external environment; one or more hardware processors; a passphrase detector executable by the one or more hardware processors and configured to detect, from the recorded sound of the external environment, a passphrase uttered by a user; and an activator executable by the one or more hardware processors and configured to activate the sound transmission measures of the secure audio firewall responsive to detecting the passphrase, wherein the sound transmission measures facilitate transmission of the sound in the external environment to the internal environment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 5 illustrates example operations for operating a secure audio firewall enclosure.

DETAILED DESCRIPTION

As noted above, conventional user computing devices (e.g., voice-based personal assistant home devices, smartphones, tablet computing devices, etc.) may include system or application settings that the user can configure to restrict access to sound data recorded by the user computing device. However, such controls are not effective as users may still be presented later with advertisements that are relevant to conversations that the smartphone transmitted to the remote servers.

The disclosed technology addresses these deficiencies of conventional privacy controls by providing a secure audio firewall that uses audio cancellation and selective audio transmission methods and systems to prevent the recording of sound by the user computing device while the user computing device is within the secure audio firewall. Accordingly, the methods and systems of the disclosed technology filter what audio can be sensed by various electronic listening devices. In some implementations, the secure audio firewall is a secure container that can be formed as any three-dimensional (3D) shape, such as a rectangular/cubic box, a cylinder-shaped container, a spherical-shaped container, or a dome-shaped container. The disclosed technology may use sound cancellation, sound isolation, and white/pink noise technologies to disable audio transmission to designated electronic listening devices. This disclosed technology may also incorporate one or more of sound cancellation vacuum panels, soundproofing materials, or sound reduction materials as part of the audio disablement methods.

In some implementations, the secure audio firewall of the disclosed technology is an autonomous turnkey device operating in a strictly local manner without connection to any external systems. For example, the secure audio firewall may not communicate with other devices and does not include data communication facilities including Internet, Cellular data communication, long-range ("LORA") communications, or any other data communication methods.

Accordingly, the secure audio firewall not only prevents audio of its external environment from reaching the desired electronic listening devices contained within it but also itself cannot transmit audio to cloud-based systems.

Figure 1:
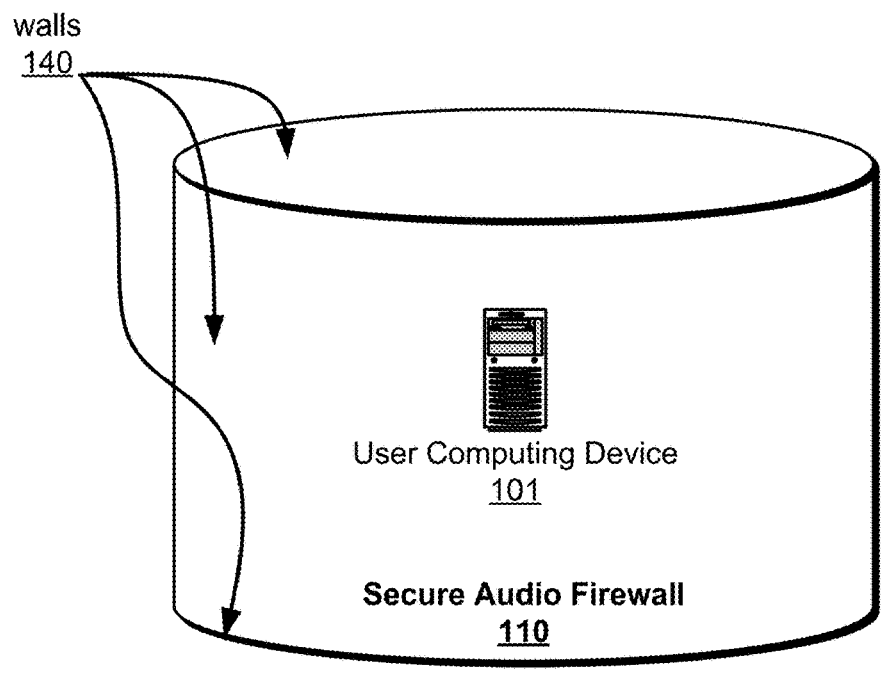
FIG. 1 illustrates a secure audio firewall with a user computing device enclosed within it.

FIG. 1 illustrates a secure audio firewall 110 with a user computing device 101 enclosed within it. As depicted in FIG. 1, secure audio firewall 110 includes soundproof (or substantially soundproof) walls 140. Substantially soundproof walls 140 reduce any sound that passes through the walls 140 to below levels (e.g., power levels of one or more frequencies) necessary for speech recognition. For example, the soundproof walls 140 block sound originating from outside of the secure audio firewall 110 from entering within the secure audio firewall 110 where the user computing device 101 is housed. The example secure audio firewall 110 of FIG. 1 is a cylinder-shaped container. However, the secure audio firewall 110 can be formed as any three-dimensional container, for example, as a cylinder (as depicted in FIG. 1), a rectangular or cubical box, a sphere, a cone, or other regular or irregular three-dimensional-shaped container. In some implementations, 3D shapes having fewer edges/junctions of walls (e.g., a cylinder has two edges, a box has twelve edges) between walls may decrease the difficulty in creating and maintaining a vacuum within the secure audio firewall 110 compared to 3D shapes having more edges/junctions of walls.

In some implementations, the secure audio firewall 110 includes a door or detachable portion of one of its soundproof walls 140 such that the user can place the user computing device 101 within the secure audio firewall 110. In some implementations, the secure audio firewall 110 includes motorized components that are operable to open one or more of its soundproof walls 140 or at least a portion of one or more of its soundproof walls 140 so that the user can place the user computing device 101 within the secure audio firewall 110.

Soundproof walls may be actualized with soundproof materials, sound-deadening materials, vacuum walls or through other soundproofing methods. In some implementations, the soundproof walls 140 are made of a soundproof material, for example, a mass-loaded material. In some implementations, the soundproof walls 140 include an inner and an outer pane, and a vacuum is maintained in an area within (e.g., between) the inner and outer panes of the soundproof walls 140. In some implementations, the soundproof walls 140 are double-pane acrylic panels with a vacuum between the panes to prevent or significantly reduce exterior sound from reaching the box interior. In some implementations, the soundproof walls 140 are transparent or substantially transparent. In some implementations, the soundproof walls are made of a sound-dampening material which dampens sound passing through the walls Aspects of the secure audio firewall not specifically described with respect to FIG. 1 may be the same or similar to other implementations described herein.

Figure 2:
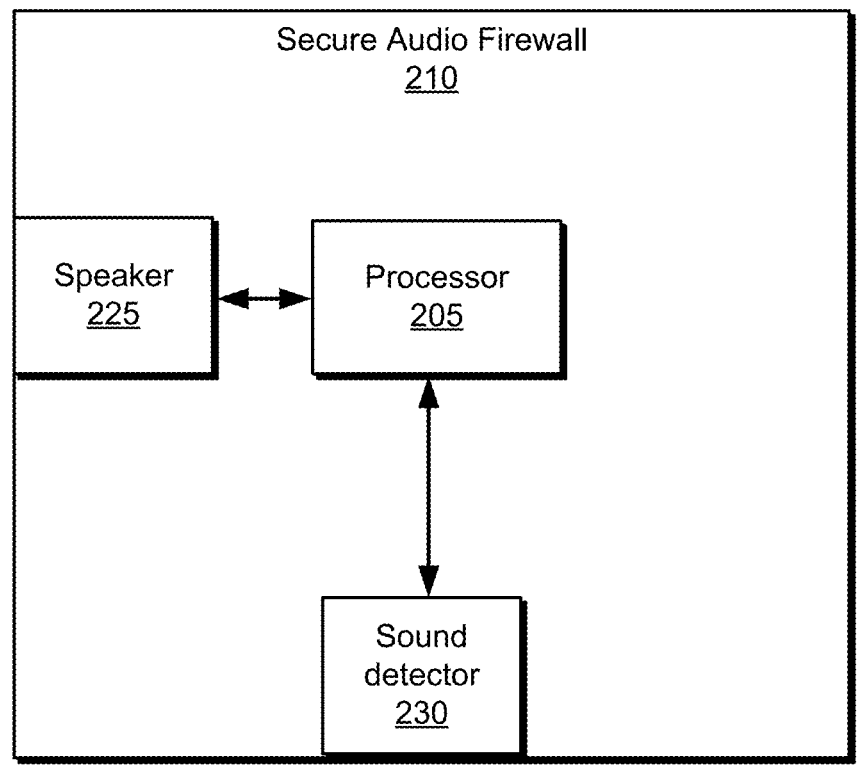
FIG. 2 illustrates an example secure audio firewall.

FIG. 2 illustrates an example secure audio firewall 210. In some implementations, secondary means for preventing sound (e.g., conversations) from being recorded by the user computing device that is housed within the secure audio firewall 210 are employed. In some implementations, the walls of the secure audio firewall are not completely or substantially soundproof and the secondary means are also employed to mask and/or cancel any sound that is not blocked by the soundproof walls. In some implementations, the walls of the secure audio firewall are completely or substantially soundproof (e.g., by means of construction material and/or creation of a vacuum) and secondary means are also employed to mask and/or cancel any sound that is not blocked by the soundproof walls.

The example secure audio firewall 210 includes a processor 205, a speaker 225, and a sound detector 230. For example, the walls can include one or more sound detectors (e.g., the sound detector 230) and speakers (e.g., the speaker 225) that are within the wall, attached to the wall, or within a predefined proximity to the wall. The walls of the secure audio firewall 210 are not soundproof. In some implementations, the walls of the secure audio firewall 210 may be sound-dampening. When sound passes through a wall of the secure audio firewall 210, the sound detector 230 detects vibrations of the wall caused by the sound. The processor 205 can access current vibration data detected by the sound detector 230 and communicate with the speaker 225 to instruct the speaker 225 to emit sound that cancels (or masks) sounds that are entering the secure audio firewall 110 and that are causing the detected vibrations. Accordingly, the secure audio firewall 210 can apply sound cancellation and sound masking techniques using the processor 205, at least one sound detector (e.g., the sound detector 230), and at least one speaker (e.g., speaker 225).

In some implementations, the secure audio firewall 210 is vented with a sound-absorbing baffle vent, and the processor 205 instructs the speaker 225 to introduce white noise and/or pink noise within the interior of the secure audio firewall 210 so that any sound that does make its way inside the enclosure is hidden by the random sound patterns of generated white and/or pink noise. For example, in some implementations, white noise includes all frequencies across the spectrum of audible sound in equal measure. Because white noise spans multiple bands of sound, it is sometimes referred to as broadband noise. In some implementations, pink noise is a broadband sound containing components from across the sound spectrum. Pink noise includes sounds within each octave, but the power of its frequencies decreases by a number (e.g., three) of decibels with each higher octave. In some implementations, the secure audio firewall 210 includes motorized components that are operable to open one or more of its walls or at least a portion of one or more of its walls.

Aspects of the secure audio firewall not specifically described with respect to FIG. 2 may be the same or similar to other implementations described herein.

Figure 3:
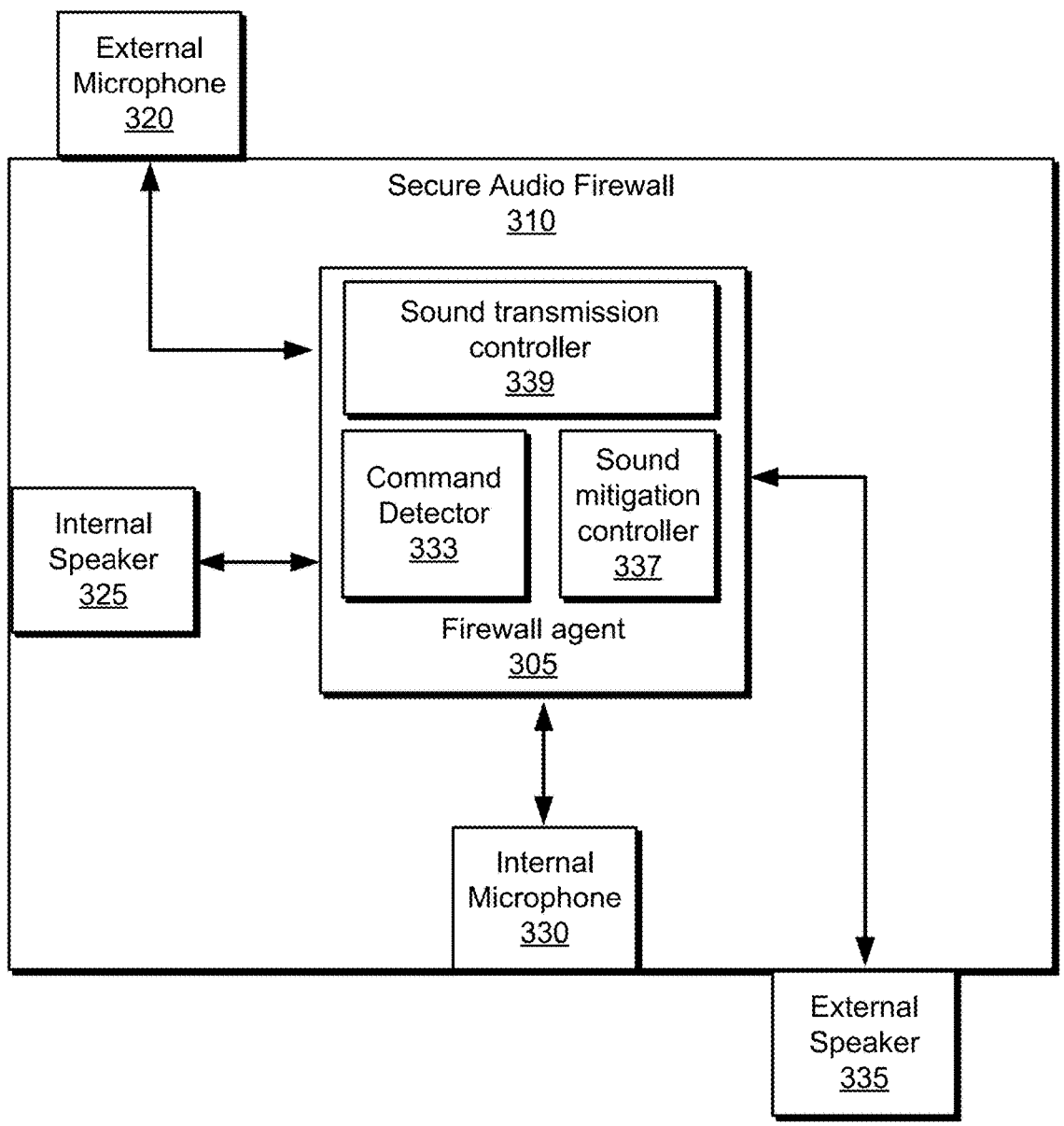
FIG. 3 illustrates a secure audio firewall that enables selective transmission of sound through the secure audio firewall.

FIG. 3 illustrates a secure audio firewall 310 that enables selective transmission of sound through the secure audio firewall 310 (e.g., from outside the secure audio firewall 310 to the inside, or vice versa). In some implementations, the secure audio firewall 310 includes one of or a combination of one or more of (a) soundproof/sound dampening walls, (b) an interior vacuum within the walls (c) sound cancellation techniques, or (d) sound masking techniques (e.g., white, and/or pink noise), as described herein.

The secure audio firewall 310 incorporates an enclosure that can guard against intelligible sound reaching the user computing device enclosed within the enclosure from the environment external to the enclosure unless the user actively enables the transmission of intelligible sound. For example, sound that includes spoken content is intelligible when the spoken content can be understood. The enclosure incorporates an internal speaker 325, an external speaker 335, an internal microphone 330, and an external microphone 320. These microphones (e.g., internal microphone 330 and external microphone 320) and speakers (e.g., internal speaker 325 and external speaker 335) provide a gateway for intelligible sound to be communicated between the user and the enclosed user computing device that is active only when verbally directed responsive to receiving a user voice command. For example, the user voice command may be a passphrase or "wait word." A firewall agent 305 (e.g., which may include one or more programmable processors or microprocessors) is configured to communicate and control the internal and external microphones and speakers forming the gateway. In some instances, the firewall agent 305 is installed at or in the base of the enclosure of the secure audio firewall 310. In some implementations, the firewall agent 305 includes a command detector 333, a sound mitigation controller 337, and a sound transmission controller 339.

In some implementations, the example secure audio firewall 310 does not communicate with the Internet nor any other wirelessly connected devices. For example, secure audio firewall 310 does not communicate with any other computing devices via the Internet, Wi-Fi, LORA, or any other type of wireless data communication. In some implementations, the secure audio firewall 310 communicates with one or more local devices via local communication channels. For example, the secure audio firewall 310 may communicate via local communication channels that permits speakers in any room of the external environment (e.g., a house) to interact with one device located in a central location. In such implementations, the secure audio firewall 310 may receive the audio including the passphrase from the one device via the local communication channel.

The example secure audio firewall 310 selectively enables the transmission of sound originating from an environment outside of the secure audio firewall 310 to the inside of the secure audio firewall 310. For example, the secure audio firewall 310 can detect, using the command detector 333 and the external microphone 320, audio commands vocalized by a user that direct the secure audio firewall 310 to enable audio in the environment outside the secure audio firewall 310 to be made available to the various electronic listening devices within the secure audio firewall 310. For example, the audio command may be a password or passphrase (e.g., "Hey Secure Audio Firewall!"). The external microphone 320 continuously records sound and transmits it to the command detector 333, which monitors the incoming sound for the passphrase. For example, the command detector 333 uses a speech recognition algorithm to detect the password or passphrase in the recorded sound. Upon (e.g., responsive to) detection of the passphrase, the command detector 333 instructs the internal speaker 325 to output sounds (e.g., further vocal commands to the user computing device uttered by the user, for example, a passphrase for a vocal assistant on the user computing device) received via the external microphone 320.

In some implementations, in addition to uttering the passphrase, the user also interacts with the secure audio firewall 310, for example, by pressing a button or providing input to a user interface of the secure audio firewall 310. The command detector 333, responsive to detecting the interaction and to detecting the utterance of the passphrase, instructs the internal speaker 325 to output sounds received via the microphone 320. In some implementations, instead of or in addition to uttering the passphrase, the user may interact with the secure audio firewall 310, for example, by pressing a button or providing another input to a user interface of the secure audio firewall 310. The command detector 333, responsive to detecting the input, instructs the internal speaker 325 to output sounds received via the microphone 320.

In some implementations, when the command detector 333 detects a first passphrase associated with the secure audio firewall 310 via the external microphone 320, the sound transmission controller 339 instructs the internal speaker 325 to output a second passphrase associated with an assistant on the user computing device that is enclosed within the secure audio firewall 310. For example, upon the command detector 333 detecting the passphrase associated with the secure audio firewall 310 (e.g., "Hey Secure Audio Firewall"), the sound transmission controller 339 instructs the internal speaker 325 to output the passphrase associated with the assistant on the user computing device (e.g., "Hey Assistant!") and then instructs the internal speaker 325 to output sounds (e.g., further vocal commands to the user computing device uttered by the user) received via the external microphone 320.

For example, the user uses the wait word "Hey Secure Audio Firewall!" to enable the secure audio firewall 310 to transmit outside sounds into the secure audio firewall 310 (e.g., via the external microphone 320 and the internal speaker 325) so that the user can issue voice commands to the enclosed user computing device. Upon the command detector 333 detecting the phrase "Hey Secure Audio Firewall!" in the voice command, the sound transmission controller 339 causes the internal speaker 325 to deliver a "Hey Assistant!" voice command to the assistant on the user computing device. The sound transmission controller 339 then enables open communication between the user and the user computing device via the internal/external microphones and the internal/external speakers. For example, the user may subsequently say "Please play song, X," the secure audio firewall 310 (e.g., the command detector 333) receives the user command via the external microphone 320, and broadcasts (e.g., using the sound transmission controller 339) the command to the enclosed user computing device via the internal speaker 325. The enclosed user computing device then receives the command and outputs song X responsive to the user voice command. The secure audio firewall 310 (e.g., the sound transmission controller 339) communicates song X output by the user computing device using the internal microphone 330 and the external speaker 335. The user then hears the song X output by the user computing device broadcast via the external speaker 335 of the secure audio firewall 310.

In some examples, the firewall agent 305, after detecting (e.g., using the command detector 333) the first passphrase and outputting (e.g., using the sound transmission controller 339) the second passphrase via the internal speaker 325, waits for a response audio output generated by the user computing device to the user. If a response from the user computing device (e.g., received via the internal microphone 330) is not detected (e.g., using the command detector 333) within a predefined threshold amount of time (e.g., 15 seconds, 30 seconds, or another time limit), then the sound transmission controller 339 turns off communication between the user and user computing device and the command detector 333 awaits to detect, via the external microphone 320, another "Hey Secure Audio Firewall!" command from the user. If a response from the user computing device is detected (e.g., via the internal microphone 330) within the predefined threshold amount of time, then command detector 333 monitors for a predefined threshold (e.g., 15 seconds, 30 seconds, or another predefined time limit) of silence from the user computing device after which the sound transmission controller 339 turns off communication between the user and the user computing device and monitors the sound detected via the external microphone 320 for another "Hey Secure Audio Firewall!" command from the user.

In some implementations, the internal microphone 330 and external speaker 335 are always activated so that the secure audio firewall 310 can transmit any sounds (e.g., emergency alerts, alerts for phone/video calls, reminders) that are output by the enclosed user computing device to the environment outside of the secure audio firewall 310 so that the user can hear these sounds and decide whether to take any action with respect to these sounds. In some implementations, responsive to receiving input from the user (e.g., the user utters a specific passphrase and the command detector 333 detects the utterance of the specific passphrase), the sound mitigation controller 337 can disable the internal microphone 330 and external speaker 335 so that the user does not hear any sounds/alerts from the user computing device.

In some implementations, the secure audio firewall 310 could be used to control voice transmission to any cloud-based Voice Service. In this Example we will control a Voice Service on a user computing device which is placed within the secure audio firewall 310, thereby preventing direct external audio being sensed by the Voice Service on the user computing device.

The secure audio firewall 310 in some implementations may include a display. In some implementations, the secure audio firewall may include a lamp that can indicate when the user computing device enclosed within the secure audio firewall 310 is secure from the external environment versus when the user computing device is capable of listening to the external environment.

Aspects of the secure audio firewall not specifically described with respect to FIG. 3 may be the same or similar to other implementations described herein.

Figure 4:
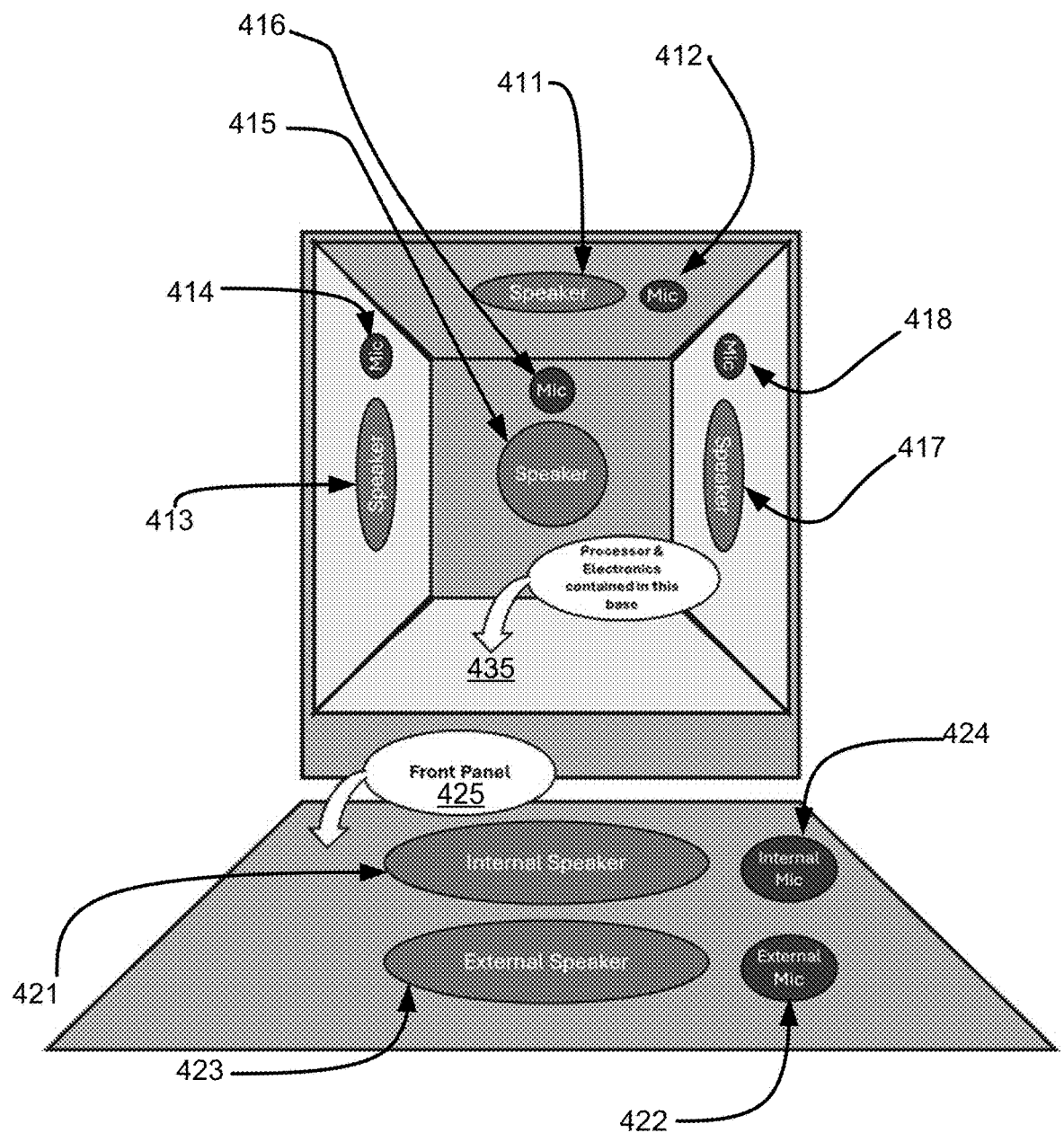
FIG. 4 illustrates how speaker-microphone pairs enable sound to flow in and out of a secure audio firewall.

FIG. 4 illustrates how speaker-microphone pairs enable sound to flow in and out of a secure audio firewall 410. For example, an internal speaker (e.g., internal speaker 421) paired with an external microphone (e.g., external microphone 422) communicates externally generated into the enclosure. Similarly, an internal microphone 424 paired with an external speaker 423 communicates sound generated by the enclosed user computing device outside of the enclosure.

As shown in FIG. 4, the front panel 425 of the example secure audio firewall 410 includes an external speaker 423 and internal microphone 424 (internal mic) on its front panel for communication of alerts provided by an enclosed user computing device from within the secure audio firewall 410 to the user outside of the secure audio firewall. Also, FIG. 4 depicts an internal speaker 421 and external microphone 422 (external mic) for communication of sound received from outside of the secure audio firewall 410 to the user computing device enclosed within the secure audio firewall 410. In some implementations, the internal speaker 421 is not activated until a processor of the secure audio firewall 410 detects a passcode/passphrase uttered by the user and upon detection of this passcode/passphrase, the processor instructs the internal speaker 421 to output a passphrase/passcode associated with a Voice Assistant on the user computing device enclosed within the secure audio firewall 410. FIG. 4 also shows other optional pairs of speakers (e.g., the speaker 411, the speaker 413, the speaker 415, and the speaker 417) and microphones (e.g., the microphone 412 paired with the speaker 411, the microphone 414 paired with the speaker 413, the microphone 416 paired with the speaker 415, and the microphone 418 paired with the speaker 417 on four of its walls, each of which can either be an internal speaker paired with an external microphone or an external speaker paired with an internal microphone. In some implementations, the secure audio firewall 410 of FIG. 4, the processor is located in, on, under, on top of, or within the base 435 of the secure audio firewall. Aspects of the secure audio firewall 410 not specifically described with respect to FIG. 4 may be the same or similar to other implementations described herein.

In some implementations, the external microphones and external speakers may be extended from the implementation enclosure through wired connections or possibly wireless connections such as Bluetooth.

In some implementations, only an external microphone, or microphones, are used. Upon hearing a particular passphrase such as "Secure Audio Firewall Off", the enclosure may open physical portals in the walls or raise walls or raise the entire device using motors or actuators and turn off any noise generators inside the enclosure so that the user may directly communicate with the internally housed assistant device. Upon completion of the interaction and upon hearing another passphrase directive such as "Secure Audio Firewall On", the enclosure may close all portals and/or walls and again turn on noise generation inside the enclosure, if such is used, to again isolate the internally housed assistant device from the external environment.

FIG. 5 illustrates example operations 500 for operating a secure audio firewall enclosure. The example operations 500 includes an example detecting operation 510 and an example activation operation 520.

The detecting operation 510 detects, from an audio recording captured in an external environment of a secure audio firewall enclosure, a passphrase, wherein the secure audio firewall enclosure is configured with sound mitigation measures to suppress sound in the external environment as it traverses the secure audio firewall enclosure to an internal environment within the secure audio firewall enclosure. In some implementations, the sound mitigation measures include one or more of soundproof walls or sound-dampening walls of the secure audio firewall enclosure. The sound mitigation measures may include emitting, via the secure audio firewall, a suppressive sound, wherein suppressing the transmission of the sound includes canceling or overpowering the transmission of the sound. The suppressive sound may include one or more of white noise or pink noise. The sound mitigation measures may include a vacuum maintained within the internal environment by walls of the secure audio firewall enclosure.

Figure 6:
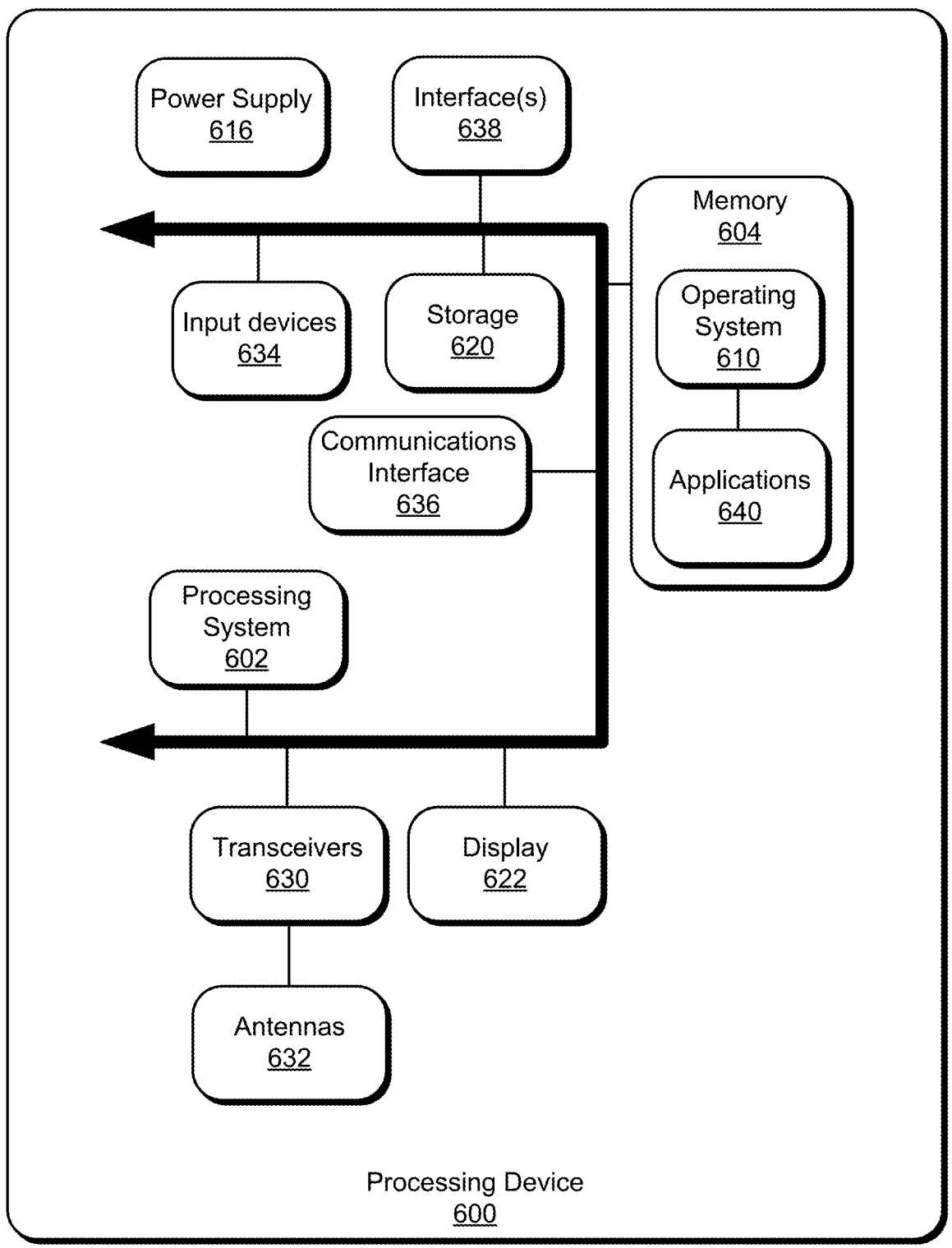
FIG. 6 illustrates an example computing device for use in implementing the described technology.

The activation operation 520 activates sound transmission measures of the secure audio firewall enclosure responsive to detecting the passphrase, wherein the sound transmission measures facilitate the transmission of the sound from the external environment to the internal environment. In some implementations, activating the sound transmission measures includes disabling one or more of the sound mitigation measures. The sound transmission measures of the secure audio firewall enclosure may include an external microphone and an internal speaker, the external microphone, and the internal speaker configurable to transmit, to the internal environment, the sound of the external environment detected at the external microphone, wherein activating the transmission measures includes activating the external microphone and the internal speaker. The sound transmission measures of the secure audio firewall enclosure may include an external microphone and an internal speaker, the external microphone, and the internal speaker configurable to transmit, to the internal environment, the sound of the external environment detected at the external microphone, wherein activating the transmission measures includes activating the external microphone and the internal speaker. Activating the sound transmission measures of the secure audio firewall may further include broadcasting, by the internal speaker, a passphrase configured to activate a voice assistant of a user computing device enclosed within the secure audio firewall enclosure. The sound transmission measures of the secure audio firewall enclosure may further include an internal microphone and an external speaker, the internal microphone, and the external speaker configurable to output, to the external environment, sound output by a user computing device in the internal environment detected at the internal microphone, wherein activating the transmission measures further includes activating the internal microphone and the external speaker. In some implementations, the activation operation 520 further includes deactivating, responsive to detecting no further sound uttered by the user within a predefined amount of time after activating the sound transmission measures, the sound transmission measures FIG. 6 illustrates an example computing device 600 for use in implementing the described technology. The computing device 600 may be a user computing device (such as a laptop computer, a desktop computer, or a tablet computer), a secure audio firewall, a server/cloud computing device, an Internet-of-Things (IoT), any other type of computing device, or a combination of these options. The computing device 600 includes one or more hardware processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more software modules, segments, and/or processors, such as applications 640, a processor of a secure audio firewall, a user computing device, and other program code and modules are loaded into the operating system 610 on the memory 604 and/or the storage 620 and executed by the processor(s) 602. The storage 620 may store control data (e.g., programming code) and other data and be local to the computing device 600 or may be remote and communicatively connected to the computing device 600. In one implementation, components of a system for classifying a dataset may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, pushbuttons or mouse). These and other input devices may be coupled to the server by one or more interfaces 638, such as a serial port interface, parallel port, or universal serial bus (USB). The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method for operating a secure audio firewall enclosure, wherein the secure audio firewall enclosure is configured with sound mitigation measures to suppress transmission of sound in an external environment to an internal environment within the secure audio firewall enclosure, the method comprising: detecting, from an audio recording captured in an external environment of a secure audio firewall enclosure, a passphrase uttered by a user; and activating sound transmission measures of the secure audio firewall enclosure responsive to detecting the passphrase, wherein the sound transmission measures facilitate transmission of the sound in the external environment to the internal environment.

Clause 2. The method of clause 1, wherein the sound mitigation measures include one or more of soundproof walls or sound-dampening walls of the secure audio firewall enclosure.

Clause 3. The method of clause 1, wherein the sound mitigation measures include emitting, via the secure audio firewall, a suppressive sound, wherein suppressing the transmission of the sound includes canceling or overpowering the transmission of the sound.

Clause 4. The method of clause 3, wherein the suppressive sound includes one or more of white noise or pink noise.

Clause 5. The method of clause 1, wherein the sound mitigation measures include a vacuum maintained within the internal environment by walls of the secure audio firewall enclosure.

Clause 6. The method of clause 1, wherein activating the sound transmission measures includes disabling one or more of the sound mitigation measures.

Clause 7. The method of clause 1, wherein the sound transmission measures of the secure audio firewall enclosure include an external microphone and an internal speaker, the external microphone and the internal speaker configurable to transmit, to the internal environment, the sound of the external environment detected at the external microphone, wherein activating the transmission measures includes activating the external microphone and the internal speaker.

Clause 8. The method of clause 7, wherein activating the sound transmission measures of the secure audio firewall further includes broadcasting, by the internal speaker, a passphrase configured to activate a voice assistant of a user computing device enclosed within the secure audio firewall enclosure.

Clause 9. The method of clause 7, wherein the sound transmission measures of the secure audio firewall enclosure further include an internal microphone and an external speaker, the internal microphone and the external speaker configurable to output, to the external environment, sound output by a user computing device in the internal environment detected at the internal microphone, wherein activating the transmission measures further includes activating the internal microphone and the external speaker.

Clause 10. The method of clause 1, further comprising deactivating, responsive to detecting no further sound uttered by the user within a predefined amount of time after activating the sound transmission measures, the sound transmission measures.

Clause 11. A secure audio firewall system configured to prevent, absent activation of sound transmission measures of the secure audio firewall, a user computing device in an internal environment of the secure audio firewall from detecting content of sound originating from an external environment of the secure audio firewall, the secure audio firewall comprising: walls forming an enclosure of the secure audio firewall, the enclosure separating the internal environment from the external environment; an external microphone configured to record sound of the external environment; one or more hardware processors; a passphrase detector executable by the one or more hardware processors and configured to detect, from the recorded sound of the external environment, a passphrase uttered by a user; and an activator executable by the one or more hardware processors and configured to activate the sound transmission measures of the secure audio firewall responsive to detecting the passphrase, wherein the sound transmission measures facilitate transmission of the sound in the external environment to the internal environment.

Clause 12. The secure audio firewall system of clause 11, wherein the walls include one or more of soundproof walls or sound dampening walls.

Clause 13. The secure audio firewall system of clause 11, further comprising an internal speaker configured to emit a suppressive sound to cancel or overpower the sound so that the content of the sound is not detectable by the user computing device, wherein activating the sound transmission measures includes ceasing an emission of the suppressive sound by the internal speaker.

Clause 14. The secure audio firewall system of clause 13, wherein the suppressive sound includes one or more of white noise or pink noise.

Clause 15. The secure audio firewall system of clause 11, the walls supporting a vacuum in the internal environment to prevent the content of the sound originating from an external environment from being detected by the user computing device.

Clause 16. The secure audio firewall system of clause 11, wherein activating the sound transmission measures includes disabling sound mitigation measures.

Clause 17. The secure audio firewall system of clause 11, further comprising: an internal speaker in the internal environment, wherein activating the transmission measures includes activating the internal speaker to transmit to an internal environment the sound of the external environment recorded by the external microphone.

Clause 18. The secure audio firewall system of clause 17, wherein activating the sound transmission measures of the secure audio firewall further includes broadcasting, by the internal speaker, a passphrase configured to activate a voice assistant of the user computing device.

Clause 19. The secure audio firewall system of clause 11, further comprising: an internal microphone in the internal environment; and an external speaker in the external environment, wherein activating the sound transmission measures of the secure audio firewall enclosure further includes outputting, by the external speaker, sound output by a user computing device in the internal environment detected at the internal microphone.

Clause 20. The secure audio firewall system of clause 11, the activator further configured to deactivate, responsive to detecting no further sound uttered by the user within a predefined amount of time after activating the sound transmission measures, the sound transmission measures.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, programming code, code segments, programming code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for operating a secure audio firewall enclosure, wherein the secure audio firewall enclosure is configured with sound mitigation measures to suppress transmission of sound from an external environment outside of the secure audio firewall enclosure to an internal environment within the secure audio firewall enclosure, wherein the sound mitigation measures include a vacuum maintained within the internal environment by walls of the secure audio firewall enclosure, the method comprising:
   detecting, from an audio recording captured in the external environment of the secure audio firewall enclosure, a passphrase uttered by a user; and
   activating sound transmission measures of the secure audio firewall enclosure responsive to detecting the passphrase, wherein the sound transmission measures facilitate transmission of the sound from the external environment to the internal environment.

2. The method of claim 1, wherein the sound mitigation measures include one or more of soundproof walls or sound-dampening walls of the secure audio firewall enclosure.

3. The method of claim 1, wherein the sound mitigation measures include emitting, via the secure audio firewall enclosure, a suppressive sound, wherein suppressing the transmission of the sound includes canceling or overpowering the transmission of the sound.

4. The method of claim 3, wherein the suppressive sound includes one or more of white noise or pink noise.

5. The method of claim 1, wherein activating the sound transmission measures includes disabling one or more of the sound mitigation measures.

6. A method for operating a secure audio firewall enclosure, wherein the secure audio firewall enclosure is configured with sound mitigation measures to suppress transmission of sound from an external environment outside of the secure audio firewall enclosure to an internal environment within the secure audio firewall enclosure, the method comprising:
   detecting, from an audio recording captured in the external environment of the secure audio firewall enclosure, a passphrase uttered by a user; and
   activating sound transmission measures of the secure audio firewall enclosure responsive to detecting the passphrase, wherein the sound transmission measures facilitate transmission of the sound from the external environment to the internal environment, wherein the sound transmission measures of the secure audio firewall enclosure include an external microphone and an internal speaker, the external microphone and the internal speaker configurable to transmit, to the internal environment, the sound of the external environment detected at the external microphone, wherein activating the sound transmission measures includes activating the external microphone and the internal speaker.

7. The method of claim 6, wherein activating the sound transmission measures of the secure audio firewall enclosure further includes broadcasting, by the internal speaker, a passphrase configured to activate a voice assistant of a user computing device enclosed within the secure audio firewall enclosure.

8. The method of claim 6, wherein the sound transmission measures of the secure audio firewall enclosure further include an internal microphone and an external speaker, the internal microphone and the external speaker configurable to output, to the external environment, sound output by a user computing device in the internal environment detected at the internal microphone, wherein activating the sound transmission measures further includes activating the internal microphone and the external speaker.

9. A method for operating a secure audio firewall enclosure, wherein the secure audio firewall enclosure is configured with sound mitigation measures to suppress transmission of sound from an external environment outside of the secure audio firewall enclosure to an internal environment within the secure audio firewall enclosure, the method comprising:
   detecting, from an audio recording captured in the external environment of the secure audio firewall enclosure, a passphrase uttered by a user;
   activating sound transmission measures of the secure audio firewall enclosure responsive to detecting the passphrase, wherein the sound transmission measures facilitate the transmission of the sound from the external environment to the internal environment; and
   deactivating, responsive to detecting no further sound uttered by the user within a predefined amount of time after activating the sound transmission measures, the sound transmission measures.

10. A secure audio firewall system configured to prevent a user computing device in an internal environment inside of a secure audio firewall from detecting content communicated via sound originating from an external environment outside of the secure audio firewall, the secure audio firewall system comprising:
   walls forming an enclosure of the secure audio firewall, the enclosure separating the internal environment from the external environment;
   an external microphone configured to record the sound originating from the external environment;
   an internal speaker configured to emit a suppressive sound to cancel or overpower the sound so that the content of the sound is not detectable by the user computing device;
   one or more hardware processors;
   a passphrase detector executable by the one or more hardware processors and configured to detect, from the recorded sound, a passphrase uttered by a user; and
   an activator executable by the one or more hardware processors and configured to activate sound transmission measures of the secure audio firewall system responsive to detecting the passphrase, wherein activating the sound transmission measures includes ceasing an emission of the suppressive sound by the internal speaker, wherein the activated sound transmission measures facilitate transmission of the sound originating from the external environment to the internal environment.

11. The secure audio firewall system of claim 10, wherein the walls include one or more of soundproof walls or sound dampening walls.

12. The secure audio firewall system of claim 10, wherein the suppressive sound includes one or more of white noise or pink noise.

13. A secure audio firewall system configured to prevent a user computing device in an internal environment inside of a secure audio firewall from detecting content communicated via sound originating from an external environment outside of the secure audio firewall, the secure audio firewall system comprising:
    walls forming an enclosure of the secure audio firewall, the enclosure separating the internal environment from the external environment, the walls supporting a vacuum in the internal environment to prevent the content communicated via the sound originating from the external environment from being detected by the user computing device;
    an external microphone configured to record the sound originating from the external environment;
    one or more hardware processors;
    a passphrase detector executable by the one or more hardware processors and configured to detect, from the recorded sound, a passphrase uttered by a user; and
    an activator executable by the one or more hardware processors and configured to activate sound transmission measures of the secure audio firewall system responsive to detecting the passphrase, wherein the activated sound transmission measures facilitate transmission of the sound originating from the external environment to the internal environment.

14. The secure audio firewall system of claim 10, wherein activating the sound transmission measures includes disabling sound mitigation measures.

15. A secure audio firewall system configured to prevent a user computing device in an internal environment inside of a secure audio firewall from detecting content communicated via sound originating from an external environment outside of the secure audio firewall, the secure audio firewall system comprising:
    walls forming an enclosure of the secure audio firewall, the enclosure separating the internal environment from the external environment;
    an external microphone configured to record the sound originating from the external environment;
    an internal speaker in the internal environment;
    one or more hardware processors;
    a passphrase detector executable by the one or more hardware processors and configured to detect, from the recorded sound, a passphrase uttered by a user; and
    an activator executable by the one or more hardware processors and configured to activate sound transmission measures of the secure audio firewall system responsive to detecting the passphrase, wherein activating the sound transmission measures includes activating the internal speaker to transmit to the internal environment the sound of the external environment recorded by the external microphone, wherein the activated sound transmission measures facilitate transmission of the sound originating from the external environment to the internal environment.

16. The secure audio firewall system of claim 15, wherein activating the sound transmission measures of the secure audio firewall system further includes broadcasting, by the internal speaker, a passphrase configured to activate a voice assistant of the user computing device.

17. A secure audio firewall system configured to prevent a user computing device in an internal environment inside of a secure audio firewall from detecting content communicated via sound originating from an external environment outside of the secure audio firewall, the secure audio firewall system comprising:
    walls forming an enclosure of the secure audio firewall, the enclosure separating the internal environment from the external environment;
    an external microphone configured to record the sound originating from the external environment;
    an internal microphone in the internal environment;
    an external speaker in the external environment;
    one or more hardware processors;
    a passphrase detector executable by the one or more hardware processors and configured to detect, from the recorded sound, a passphrase uttered by a user; and
    an activator executable by the one or more hardware processors and configured to activate sound transmission measures of the secure audio firewall system responsive to detecting the passphrase, wherein activating the sound transmission measures of the secure audio firewall system further includes outputting, by the external speaker, sound output by the user computing device in the internal environment detected at the internal microphone, wherein the activated sound transmission measures facilitate transmission of the sound originating from the external environment to the internal environment.

18. A secure audio firewall system configured to prevent a user computing device in an internal environment inside of a secure audio firewall from detecting content communicated via sound originating from an external environment outside of the secure audio firewall, the secure audio firewall system comprising:
    walls forming an enclosure of the secure audio firewall, the enclosure separating the internal environment from the external environment;
    an external microphone configured to record the sound originating from the external environment;
    one or more hardware processors;
    a passphrase detector executable by the one or more hardware processors and configured to detect, from the recorded sound, a passphrase uttered by a user; and
    an activator executable by the one or more hardware processors and configured to:
        activate sound transmission measures of the secure audio firewall system responsive to detecting the passphrase, wherein the activated sound transmission measures facilitate transmission of the sound originating from the external environment to the internal environment; and
        deactivate, responsive to detecting no further sound uttered by the user within a predefined amount of time after activating the sound transmission measures, the activated sound transmission measures.

19. The method of claim 1, wherein the sound transmission measures of the secure audio firewall enclosure include an external microphone and an internal speaker, the external microphone and the internal speaker configurable to transmit, to the internal environment, the sound of the external environment detected at the external microphone, wherein activating the sound transmission measures includes activating the external microphone and the internal speaker.

20. The method of claim 19, wherein activating the sound transmission measures of the secure audio firewall enclosure further includes broadcasting, by the internal speaker, a passphrase configured to activate a voice assistant of a user computing device enclosed within the secure audio firewall enclosure.

\* \* \* \* \*